March 7, 1950  H. KRONSTAD  2,499,999
CEMENT CLINKER APPARATUS
Filed July 31, 1944  7 Sheets-Sheet 1

Inventor
Haavard Kronstad
By Royal E. Burnham,
Attorney

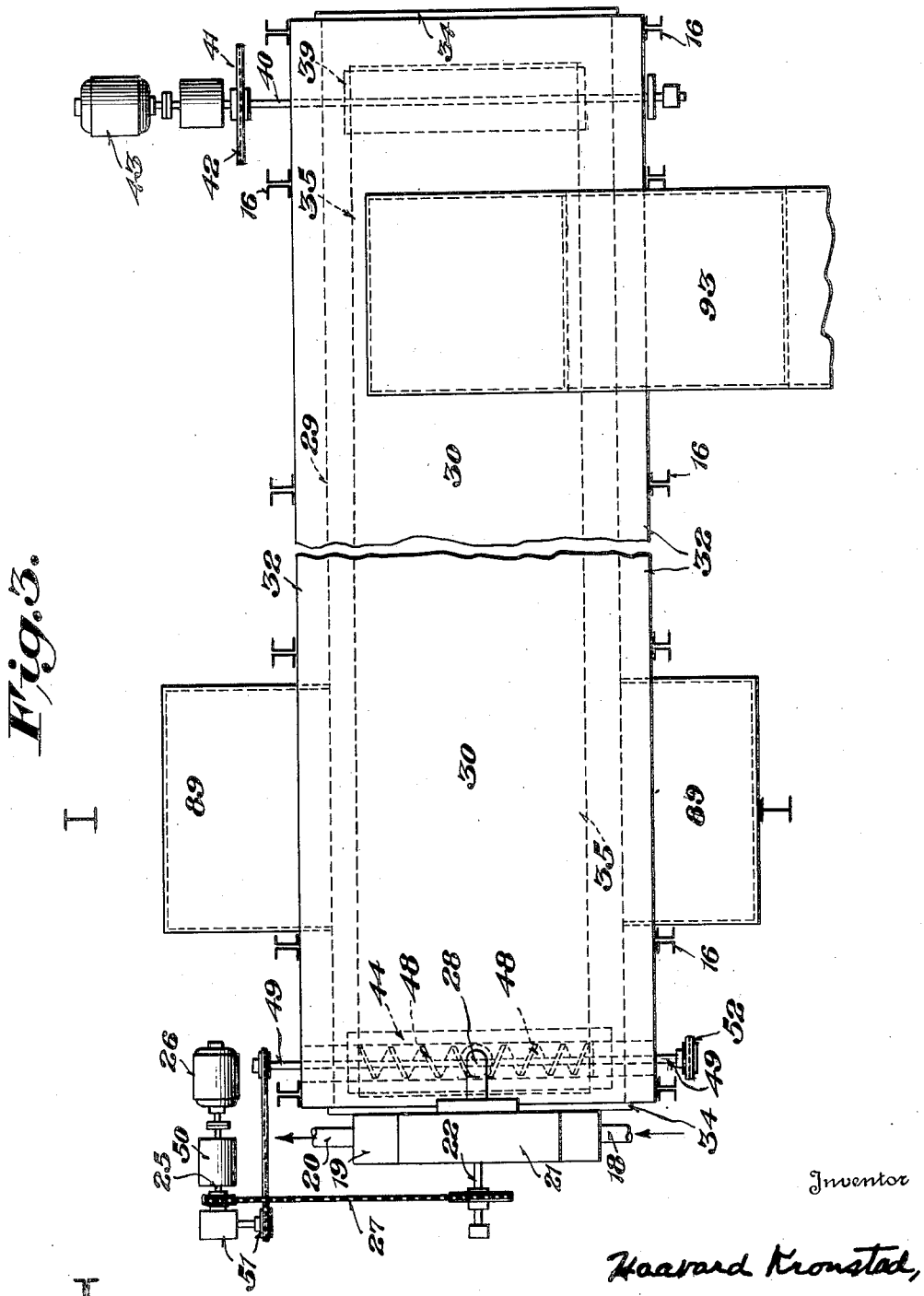

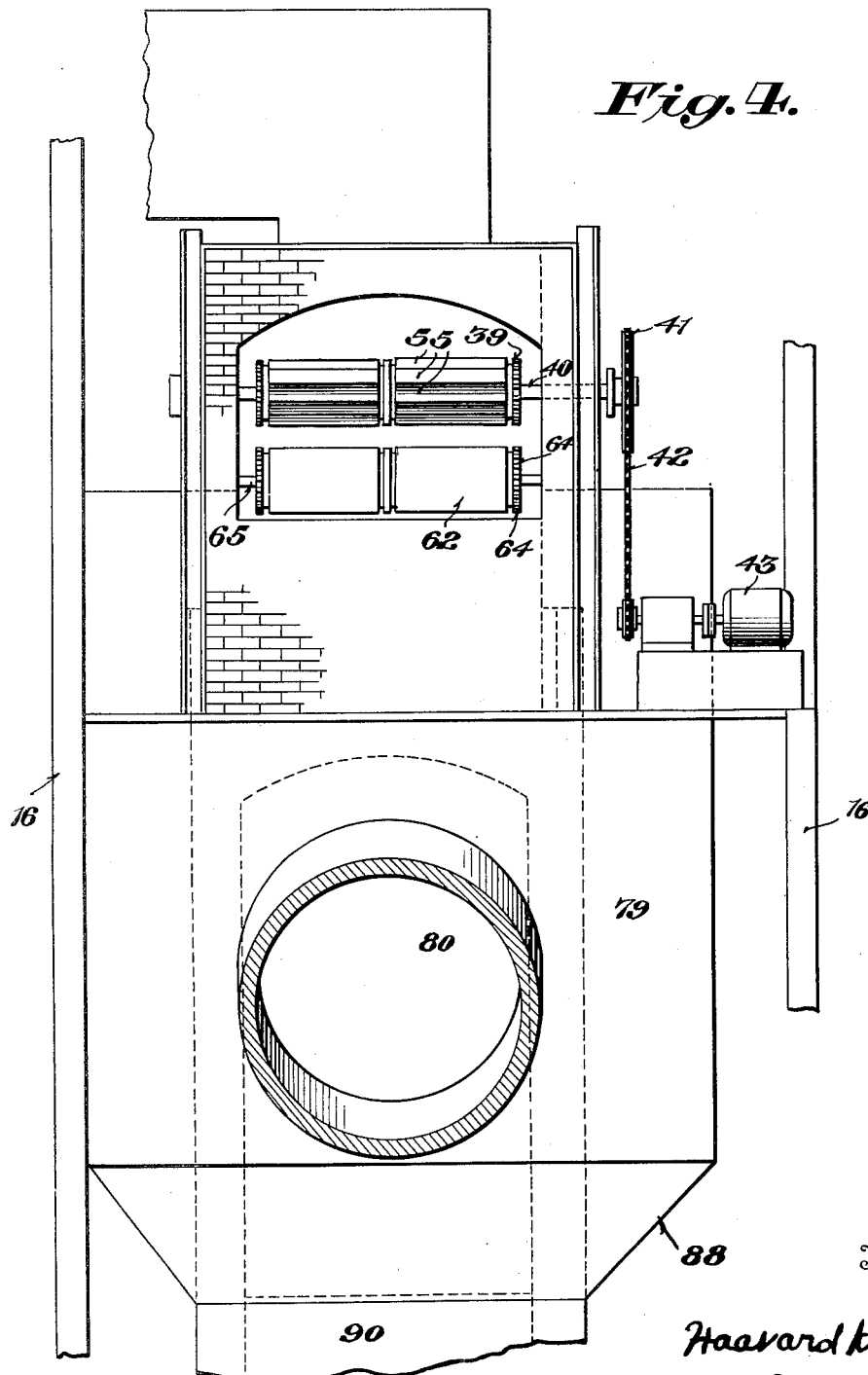

March 7, 1950 H. KRONSTAD 2,499,999
CEMENT CLINKER APPARATUS
Filed July 31, 1944 7 Sheets-Sheet 4
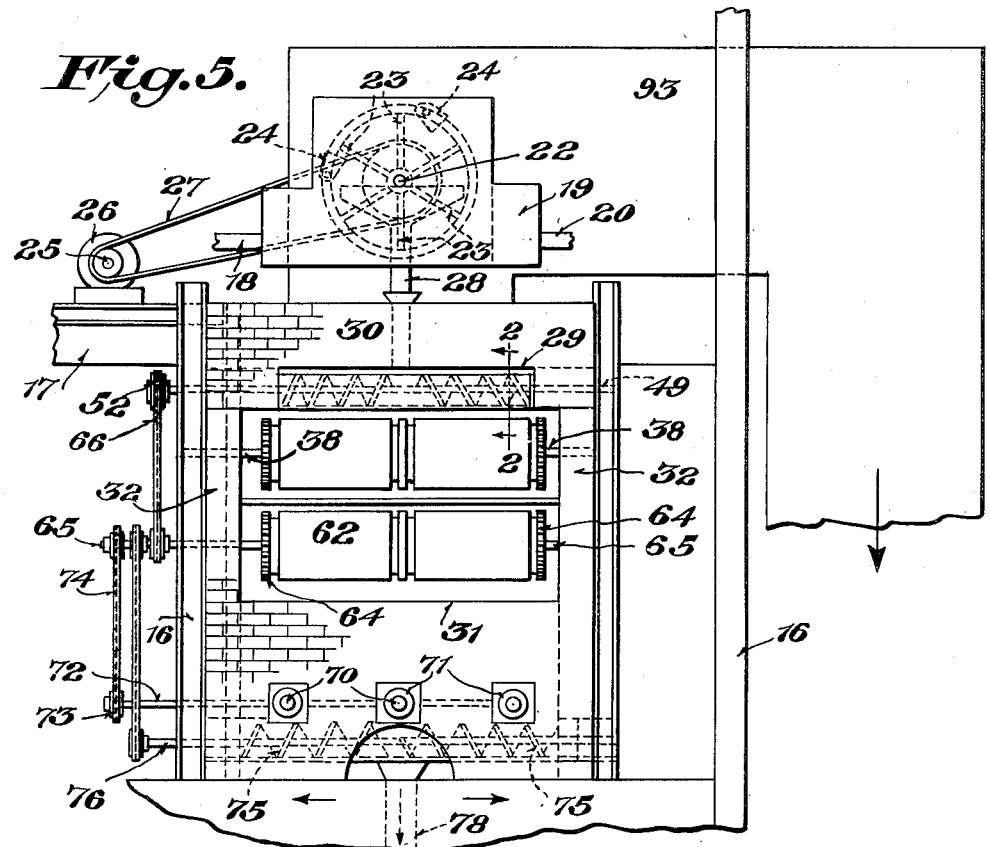
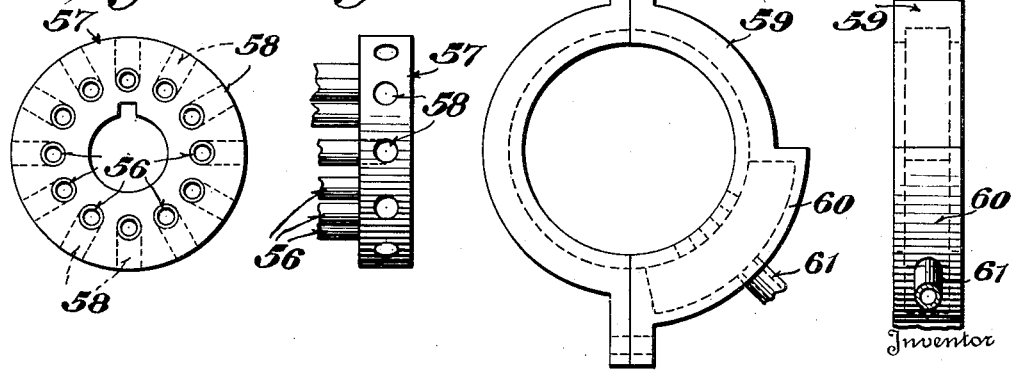
Inventor
Haavard Kronstad,
By Royal E. Burnham
Attorney March 7, 1950  H. KRONSTAD  2,499,999
CEMENT CLINKER APPARATUS
Filed July 31, 1944  7 Sheets-Sheet 5
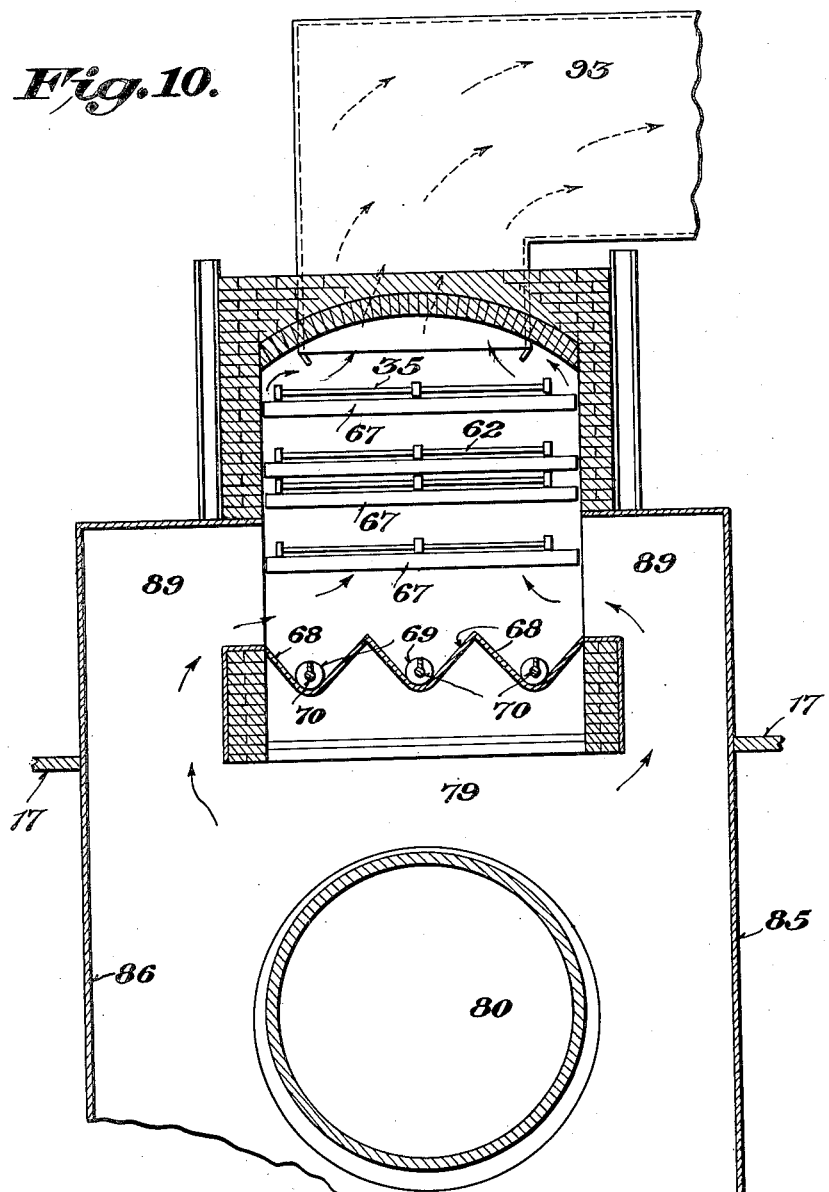
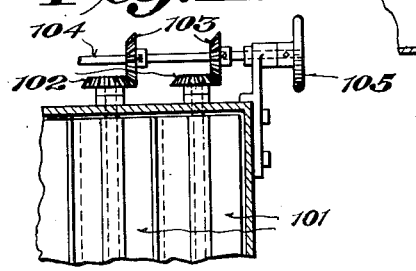
Inventor
Haavard Kronstad,
By Royal E. Burnham,
Attorney March 7, 1950 H. KRONSTAD 2,499,999
CEMENT CLINKER APPARATUS
Filed July 31, 1944 7 Sheets-Sheet 6
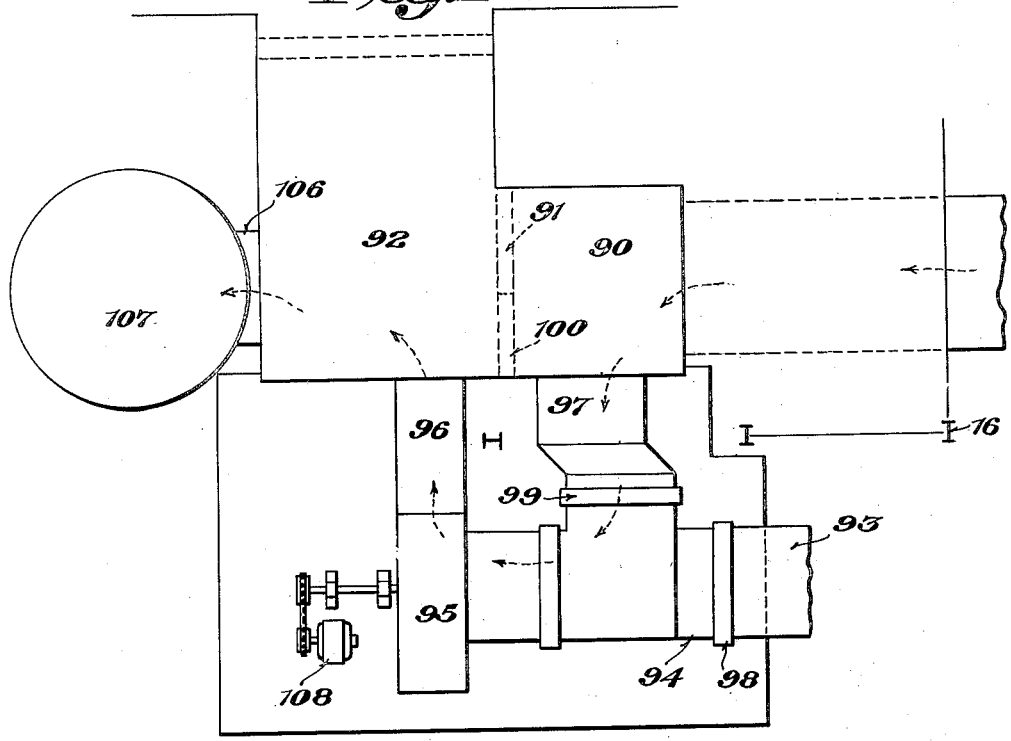
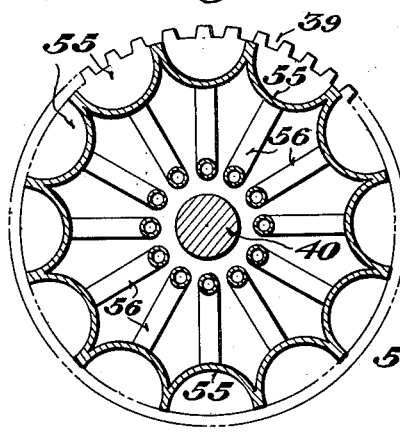
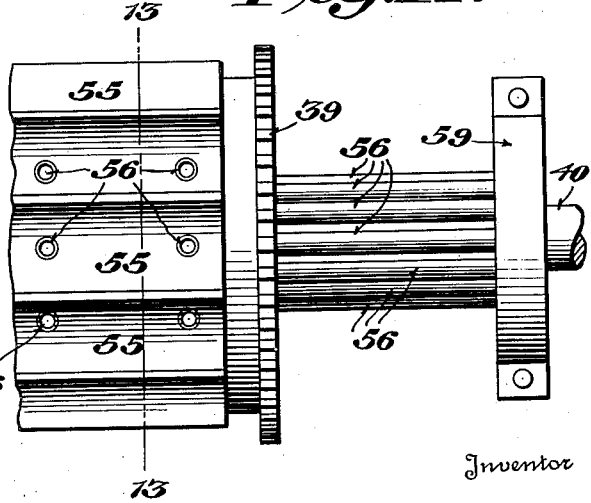
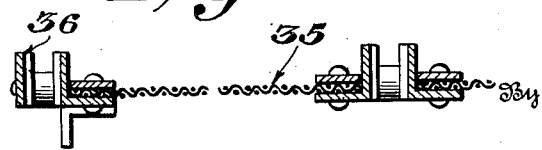
Inventor
Haavard Kronstad
By Royal E. Burnham,
Attorney March 7, 1950  H. KRONSTAD  2,499,999
CEMENT CLINKER APPARATUS
Filed July 31, 1944  7 Sheets-Sheet 7

Inventor
Haavard Kronstad,
By Royal E. Burnham,
Attorney

Patented Mar. 7, 1950

2,499,999

UNITED STATES PATENT OFFICE 2,499,999

CEMENT CLINKER APPARATUS

Haavard Kronstad, Mahoningtown, Pa.

Application July 31, 1944, Serial No. 547,488

17 Claims. (Cl. 263—53)

This invention provides an apparatus in which slurry as the raw material of production of cement clinker, or other material to be calcined, may be treated before introduction into a kiln.

Explanation of the apparatus and procedure therewith is with reference to conversion of slurry to cement clinker, but it is to be understood that the apparatus herein disclosed and claimed is not limited to treatment of that raw material.

Slurry, as it comes from a source of supply, usually is sufficiently wet to flow to feed elements of a treatment apparatus, and it is desirable to dry it or reduce its water content before it is introduced into a kiln.

The apparatus includes a drier into which hot gases are introduced directly from a slightly inclined rotary kiln of conventional type.

Among the objects of the invention are to produce apparatus in which the drier, kiln, feed devices, and control elements are associated in a relatively compact assembly; means to move slurry in the drier until it has been dried to the extent required and to deliver it directly to the kiln; means to feed slurry to the drier and to spread it across a moving conveyer belt therein; means to dislodge adhering material from the conveyer at its discharge end; means to enable the slurry to by-pass the drier and to enter the kiln directly from the feed source, means to control temperature in the drier; means to control flow of gases in the apparatus, and means to control movement of raw material in the apparatus.

Drawing

When considered with the description herein, characteristics of the invention are apparent in the accompanying drawing, forming part hereof, wherein an embodiment of the invention in an apparatus for reduction of the moisture content of slurry and production of cement clinker is disclosed for purpose of explanation.

Like reference-characters refer to corresponding parts in the views of the drawing, of which—

Fig. 3 is a plan view, with some parts indicated by dash lines;

Fig. 4 is an end view of the apparatus as seen with a door of the drier omitted, the kiln being shown in section;

Fig. 5 is an end view of the upper part of the apparatus as seen with a door of the drier omitted;

Fig. 6 is a side view of the rotor of the air-supply device;

Fig. 7 is a peripheral view thereof;

Fig. 8 is a side view of the rotor sleeve;

Fig. 9 is a peripheral view thereof;

Fig. 10 is a section on line 10—10, Fig. 1;

Fig. 11 is a fragmentary view of a damper, partly in section;

Fig. 12 is a plan view of parts of the flue-control means;

Fig. 13 is a section on line 13—13, Fig. 14;

Fig. 14 is a view of the dislodgment drum and associated parts;

Fig. 15 is a sectional view of the conveyor belt;

Figures 1, 2:
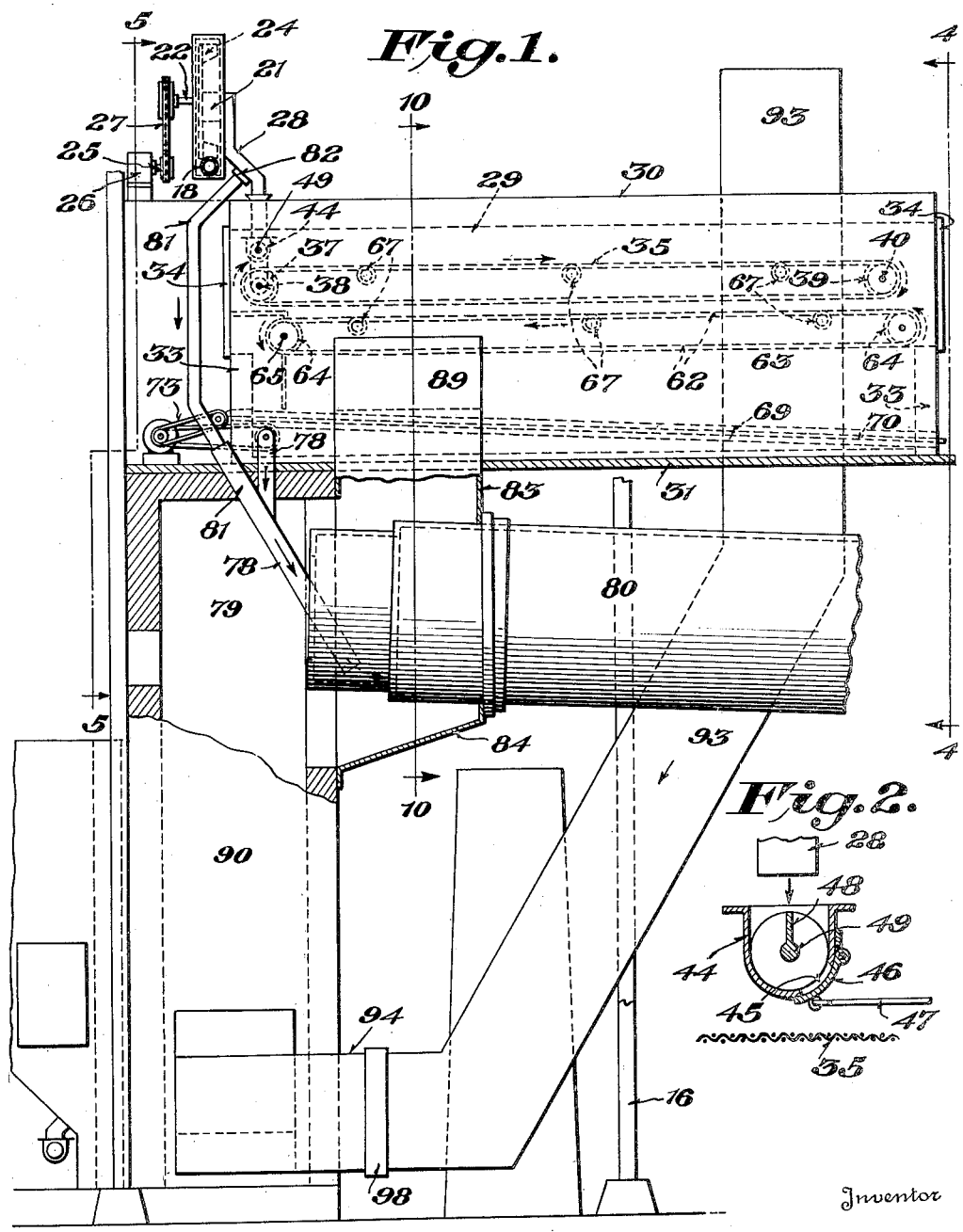
Fig. 1 is a side view of the apparatus, partly in section.
Fig. 2 is a section on line 2—2, Fig. 5.
Figure 16:
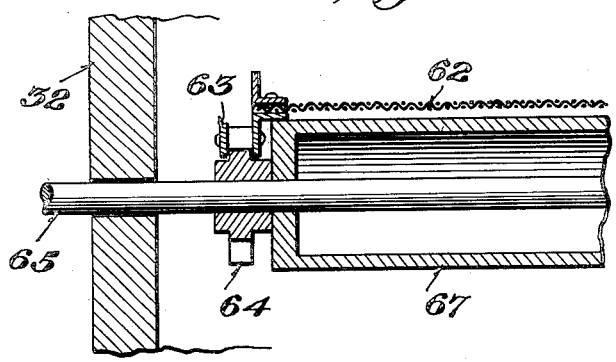
Fig. 16 is a fragmentary transverse vertical section through the lower belt conveyor in the drier chamber.
Figure 17:
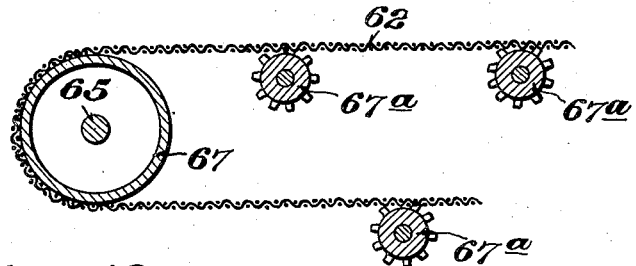
Fig. 17 is a fragmentary longitudinal section through that conveyor.
Figure 18:
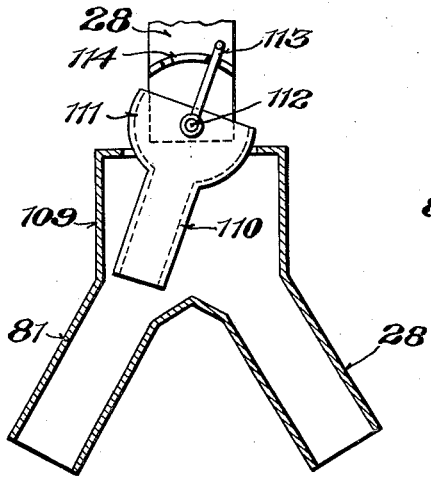
Fig. 18 is a view, partly in section, illustrative of a means to control flow of raw material in the feed pipe and by-pass of the apparatus.
Figure 19:
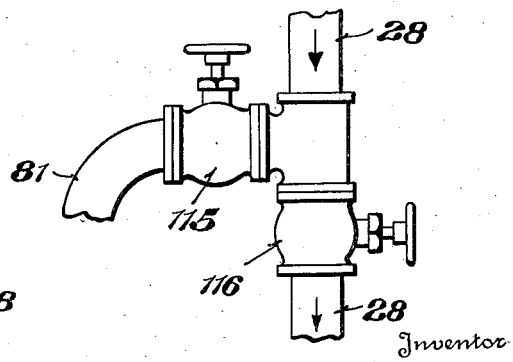
Fig. 19 is a view illustrative of another feed control means.

Parts of the apparatus may be supported and maintained in assembled condition by any suitable members, among them being stanchions 16 extending upwardly from a base and cross members 17, as shown.

Feed mechanism

Slurry is supplied by a pipe 18, from any suitable source, to a tank 19 in the upper portion of the apparatus. An overflow pipe 20 keeps the slurry at constant level in the tank when the inflow exceeds the outflow. Slurry is fed from the tank to a hopper 21. As shown, there may be used feed mechanism of the Ferris-wheel type, which includes a shaft 22, from which radiate spokes 23 carrying buckets 24 that dump material in to the hopper. The wheel may be rotated in any suitable manner, as by a shaft 25 driven by a motor through belt-pulley drive 27.

A feed pipe 28 leads from the hopper into one end of the upper portion of a drier chamber 29.

Drier

The drier chamber is in a box-like somewhat elongated substantially horizontally disposed casing having a top wall 30, a bottom wall 31, side walls 32, and end walls 33, the end walls having access openings near the top normally closed by plates or doors 34.

Within the upper portion of the drier chamber, a perforate upper conveyer belt 35 extends in approximately horizontal disposition substantially from end to end thereof.

The belt advantageously may be of woven wire of about .02-inch mesh. As seen particularly in Fig. 15, it is secured at its edges to and is carried by chains 36, with which cooperate wheels 37 on a shaft 38 at the receiving end and wheels 39 on a shaft 40 at the discharge end.

The shaft 40 has thereon a wheel 41, which is driven through a belt 42 by a motor 43 to move the upper run of the belt toward the discharge end.

The feed pipe 28 discharges into the median portion of a trough 44 disposed in the drier chamber transversely of and above the receiving end of the belt 35. The trough has a series of vents 45 in its bottom. A gate 46 is adjustable with respect to the bottom by a rod 47 to control the rate of discharge from the trough. A right-left or reverse screw distributer 48 in the trough moves slurry from the place of discharge from pipe 28 toward the trough ends and causes it to discharge through the vents and to be deposited evenly across the upper run of the belt 35. The material thus deposited on the belt moves therewith toward the discharge end thereof.

The distributer 48 is on a shaft 49 driven by motor 26 through reduction gearing 51 and wheel-belt transmission 51. The shaft has outside of the drier chamber a wheel 52.

With the usual rate of deposit of slurry on the belt 35, it has dried to cake form of about ⅝-inch thick by the time it reaches the discharge end of the belt, and some of it has a tendency to adhere to the belt.

In order to dislodge the caked slurry, means are provided to force air from below and through the upper run of the belt at its discharge end.

This means includes a series of circularly arranged, edge-abutting, closed-end pockets or troughs 55 open to the perimeter of the assembly. The troughs are parts of a drum-like structure fast on the shaft 40 between the wheels 39. That structure serves as a spool over which the belt 35 moves in going from its upper to its lower run.

Pipes 56, in communication with the troughs, extend therefrom toward the shaft 40 and thence along the shaft to a governor to supply and to regulate flow of air to the troughs. The governor includes a disk-like rotor 57 fast on shaft 40. This member has radial passages 58, which are open at ports in the periphery of the member and which at their inner ends are in communication with the pipes 56. The rotor turns in an inner groove of a sleeve 59, which is held against rotation in any suitable manner. The sleeve has an offset 60, which contains a chamber open to the periphery of the rotor and to which fluid, such as air, under pressure is supplied by a pipe 61. Fluid flows from the chamber through passages 58 and pipes 56 to the troughs 55, and by being blown through the conveyer as it moves with them in making its reverse turn it dislodges adhering material therefrom. Fluid supply is regulated by a valve (not shown) in the pipe 61.

A conveyer belt 62, similar to endless belt 35, is positioned below, and with the receiving end of its upper run beyond, the discharge end of the upper belt 35, so that it takes material dumped therefrom. The lower belt 62 also receives material that may sift through the upper belt before it reaches the discharge end.

The upper run of the belt 62 is moved in the direction opposite to that of the upper belt 35. Like the upper belt, the belt 62 is secured at its edges to and is carried by chains 63 mounted on wheels 64 on shafts 65. One of these shafts is driven by wheel 52 of the trough shaft 49 through belt-wheel transmission 66.

The upper belt turns at its receiving end and the lower belt at both ends over rollers 67. The upper belt turns at its discharge end, as previously explained, over the drum-like structure that includes the troughs 55. Both belts are supported between their ends by rollers 67a.

The lower belt 62 moves the major portion of the material received from the upper belt toward the end of the drier chamber into which the raw slurry was introduced. Some of the material, however, may drop to the bottom of the chamber before reaching the dump end of the conveyer, and some of the material blown from the upper conveyer by the dislodgement device also may go to the bottom. These droppings are received in V-shaped troughs 68, and screw conveyers 69 therein move the droppings to the end of the chamber.

Shafts 70 of these screws are driven by gears 71 on a transverse shaft 72, which is driven by a wheel 73 thereon, which is rotated through belt-wheel transmission 74 by the shaft 65.

Material dumped from the lower conveyer belt and the droppings go into a pocket at the end of the chamber. A right-left or reverse screw 75 in the pocket is on a shaft 76, which is driven by the shaft 65 through transmission elements 77.

The screw 75 centers the material to a funnel-type intake of a pipe 78. That pipe extends downwardly from the drier chamber into a gas chamber 79 therebelow, wherein it is positioned to discharge material into the upper gas-discharging end of a rotary kiln 80, which may be of a conventional slightly inclined type and turned in usual manner.

By-pass

When it is desired to feed slurry directly from the hopper 21 to the kiln, that may be done through a by-pass 81 extending from pipe 28 to pipe 78. Suitable means located at the juncture 82 of the feed pipe 28 and the by-pass 81 may be used to control flow of raw material to the gas chamber and directly to the kiln through the by-pass.

Gas chamber

The upper portion of the kiln 80 extends into the gas chamber 79, which is encompassed by walls 83, 84, 85, 86, 87, and 88, and which is below the receiving-discharge end of the drier chamber 29. Walls of the gas chamber are offset and extend upwardly opposite to and spaced from the lower parts of the side walls of the drier chamber to afford hot gas flues 89 in communication with the latter chamber below the conveyer belt 35, as seen particularly in Fig. 10.

Lower walls of the gas chamber 79 converge and extend downwardly as a gas-dust flue 90, which in its lower portion has communication, through a passage 91 with a dust chamber 92.

Temperature control

An exhaust flue 93 extends from the top of the drier chamber, near the upper conveyer discharge end, and downwardly to its connection with one end of a casing 94 in the lower part of the apparatus. That casing has associated with it means to induce and to control flow of gases in the apparatus. It connects, at the end opposite to its juncture with the flue 93, with the intake of a suction fan 95, which constitutes a draft element, and which discharges, through a flue 96, into the dust chamber 92. A flue 97 affords communication between the flue 90 and the casing 94 between its intake end and the fan.

Flow of gases from the flue 93 into the casing 94 is controlled by a damper 98, and between flue 90 and that casing by a damper 99. A damper 100 in passage 91 controls gas flow through that passage.

The dampers may be of any suitable form. For example, they may be of louvre type, as exemplified by Fig. 11, wherein vanes 101 are turnable by gears 102, pinions 103, and a shaft 104 having a hand wheel 105.

A flue 106 leads from the dust chamber 92 to a stack 107. The stack constitutes a draft element of the apparatus. The fan is driven by a motor 108.

The exhaust flue 93, the casing 94, the fan 95, the flue 96, the dust chamber 92, and the flue 106 afford a continuous passage from the drier chamber 29 to the stack 107, when the damper 98 is open; and, also, a continuous passage is afforded by the exhaust flue 93 and through the casing 94, flue 97, flue 90 at its base, passage 91, dust chamber 92, and flue 106 to the stack 107, when dampers 98, 99, and 100 are open.

The gas-dust flue 90, the passage 91, the dust chamber 92, and the flue 106 afford a continuous passage from the gas chamber 79 to the stack 107, when the damper 100 is open.

The gas-dust flue 90, the flue 97, the casing 94, the fan 95, the flue 96, the dust chamber 92, and the flue 106 afford a continuous passage from the gas chamber 79 to the stack 107, when the damper 99 is open.

The fan 95 and the stack 107 each constitutes a draft element to induce flow of gas from the drier chamber 29 and the gas chamber 79.

*Feed delivery control*

Delivery of all or part of the raw material, entering the pipe 21 from the initial feed mechanism, to the drier chamber 29 and directly to the kiln may be controlled by any suitable means; for example:

The pipe 28 may be severed at 82, and a funnel-like member 109 positioned under the lower end of the upper division, and from which extends downwardly the lower part of pipe 28 and the by-pass 81. A pipe 110, having a funnel-like upper end 111, has the lower end of the upper portion of the feed pipe 28 extending thereinto. That end of the pipe 110 is pivoted to swing on a shaft 112. That shaft has a radially extending spring arm 113, which cooperates with an arcuate rack 114. The pipe 110 is swingable to direct raw material to the by-pass 81, to the lower part of pipe 28 or to a median position to direct part of the material to the by-pass and part to the feed pipe. The pipe is held in adjusted position by the rack 114.

Instead of the control means just referred to, the by-pass may have a valve 115 near its juncture with the feed pipe, and the feed pipe may be equipped with a valve 116 below the juncture. These valves may be set to control the quantity of raw material going through the by-pass directly to the kiln and the amount going through the feed pipe to the drier.

*Operation*

Slurry fed to the upper end of the kiln moves, under the influence of kiln inclination and rotation, to the lower discharge end. The slurry is subjected to heat of a jet of burning fuel introduced at the lower end of the kiln, and hot gases of combustion move counter-current to the slurry until they discharge from the upper end of the kiln into the chamber 79.

At the start of operation of the apparatus, when it is comparatively cool, the damper 98 at the juncture of the flue 93 with the casing 94 is closed and the damper 100 in the passage 91 is open, and the damper 99 may be closed. If there is enough natural draft in the stack 107 to cause flow of gases from the gas chamber 79 through flue 90 to the dust chamber 92, it is not necessary to operate the fan.

If there is not enough natural draft, the damper 100 is closed, the damper 99 in flue 97 is opened, the damper 98 remains closed, and the suction fan is operated. This induces flow of gases from the down flue 90 and discharges them into the dust chamber 92, whence they go to the stack.

During this initial period of operation, hot gases from the kiln are not drawn through the drier chamber, and slurry is fed through the by-pass 81 to the kiln.

When gases from the kiln are hot enough, the damper 98 is opened, the dampers 99 and 100 are closed, and the fan is operated. With the dampers thus set and the fan operating, hot gases are caused to flow from the chamber 79 into and through the drier chamber 29, whence they pass through flue 93, casing 94, fan 95, and dust chamber 92 into the stack 107.

With normal calcining temperatures in the kiln, gases go therefrom to the drier chamber at temperatures between 1000° F. and 1300° F., and they leave the drier at temperatures of approximately 400° F., more or less, dependent upon the amount of heat exchange that occurs in the drier.

The rate of feed of slurry to the apparatus is controlled by regulating the speed of the shaft 22 of the Ferris wheel, or by adjusting valves 115 and 116 when they are included in the apparatus, the rate required varying with the character of the slurry and with conditions in the apparatus, and whether the slurry goes to the drier or directly to the kiln through the by-pass.

Variation of temperatures in the drier also is required, in accordance with the character of the slurry, its rate of movement in the drier, and other circumstances. Temperature in the drier may be regulated by adjustment of the dampers. The maximum temperature prevails in the drier when substantially all of the gases from the kiln go into the drier, as when damper 98 is open, the dampers 99 and 100 are closed, and the fan is operating.

When lower temperatures are required, or when for other reason flow of gases through the drier should be at a lesser rate, the damper 98 may be partly closed, the damper 99 partly opened, and the damper 100 closed. Then some of the gases are induced to flow from the gas chamber into the drier chamber and therefrom through flue 93 and some from the gas chamber down through flue 90 and through flue 97, whence they go through the fan and into the dust chamber and out through the stack.

The time the slurry remains in the drier chamber may be regulated by control of the speed of the conveyers therein. This may be done by varying the speed of the motor drives thereof or in any other suitable manner. Thus the treatment period of slurry in the drier may be in accordance with the character thereof, the temperatures and rapidity of movement of hot gases in the drier, and other operating conditions.

I claim:

1. In apparatus for production of cement clinker and the like, a casing containing a drier chamber, a conveyer in said chamber, means to drive said conveyer, a kiln, a casing containing a gas chamber disposed to receive hot gases from said kiln, means to feed raw material to said conveyer, means to feed material, emanating from said conveyer, from said drier chamber to said kiln, a hot gas flue affording communication between said gas chamber and said drier chamber, an exhaust flue extending from said drier chamber, a gas-dust flue extending from said gas chamber, dampers to control fluid flow in said flues, and means to induce outward flow of gases in said flues.

2. In apparatus for production of cement clinker and the like, a casing containing a drier chamber, a conveyer in said chamber, means to drive said conveyer, a kiln, a casing containing a gas chamber disposed to receive hot gases from said kiln, means to feed raw material to said conveyer, means to feed material, emanating from said conveyer, from said drier chamber to said kiln, a hot gas flue affording comunication between said gas chamber and drier chamber, an exhaust fan, means to drive said fan, an exhaust flue extending from said drier chamber and in communication with the intake of said fan, and a gas-dust flue extending from said gas chamber and in communication with the intake of said fan.

3. In apparatus for production of cement clinker and the like, a casing containing a drier chamber, a conveyer in said chamber, means to drive said conveyer, a kiln, a casing containing a gas chamber disposed to receive hot gases from said kiln, means to feed raw material to said conveyer, means to feed material, emanating from said conveyer, from said drier chamber to said kiln, a hot gas flue affording communication between said gas chamber and drier chamber, a casing containing a dust chamber, a stack in communication with said dust chamber, an exhaust fan discharging into said dust chamber, means to drive said fan, an exhaust flue extending from said drier chamber and in communication with the intake of said fan, a gas-dust flue extending from said gas chamber and in communication with the intake of said fan and with said dust chamber, and dampers to control fluid flow between said exhaust flue and said fan, between said gas-dust flue and said fan, and between said gas-dust flue and said dust chamber.

4. In apparatus for production of cement clinker and the like, a casing containing a drier chamber, a conveyer in said chamber, means to drive said conveyer, a casing containing a gas chamber, a kiln having its gas discharge end disposed in said gas chamber, means to feed raw material to said conveyer, means to feed material, emanating from said conveyer, from said drier chamber to said kiln, a draft element, a hot gas flue affording communication between said gas chamber and drier chamber, an exhaust flue affording communication between said drier chamber and draft element, and a damper to control fluid flow in said exhaust flue.

5. In apparatus for production of cement clinker and the like, a casing containing a drier chamber, a conveyer in said chamber, means to drive said conveyer, a casing containing a gas chamber, a kiln having its hot gas discharge end disposed in said gas chamber, means to feed raw material to said conveyer, means to feed material, emanating from said conveyer, from said drier chamber to said kiln, a draft element, a hot gas flue affording communication between said gas chamber and drier chamber, an exhaust flue affording communication between said drier chamber and draft element, a gas-dust flue affording communication between said gas chamber and draft element, and dampers to control fluid flow in said flues.

6. In apparatus for production of cement clinker and the like, a casing containing a drier chamber, a conveyer in said chamber, means to drive said conveyer, a casing containing a gas chamber, a kiln having its hot gas discharge end disposed in said gas chamber, means to feed raw material to said conveyer, means to feed material, emanating from said conveyer, from said drier chamber to said kiln, a hot gas flue affording communication between said gas chamber and drier chamber, an exhaust fan, means to drive said fan, an exhaust flue extending from said drier chamber and in communication with the intake of said fan, and a gas-dust flue extending from said gas chamber and in communication with the intake of said fan.

7. In apparatus for production of cement clinker and the like, a casing containing a drier chamber, a conveyer in said chamber, means to drive said conveyer, a casing containing a gas chamber, a kiln having its hot gas discharge end disposed in said gas chamber, means to feed raw material to said conveyer, means to feed material, emanating from said conveyer, from said drier chamber to said kiln, a hot gas flue affording communication between said gas chamber and drier chamber, a casing containing a dust chamber, a stack in communication with said dust chamber, an exhaust fan discharging into said dust chamber, means to drive said fan, an exhaust flue extending from said drier chamber and in communication with the intake of said fan, a gas-dust flue extending from said gas chamber and in communication with the intake of said fan and with said dust chamber, and dampers to control fluid flow between said exhaust flue and fan, between said gas-dust flue and fan, and between said gas-dust flue and dust chamber.

8. In apparatus for production of cement clinker and the like, the combination of a casing containing a drier chamber, a belt conveyer in said chamber, means to drive said conveyer, a spreader in said chamber above and discharging onto said conveyer at one end, a feed pipe extending into said chamber and discharging into said spreader, means to move material, emanating from said conveyer, toward an end of said chamber, a casing containing a gas chamber, a rotary inclined kiln having its upper gas discharging end extending into said gas chamber, means to feed material from said drier chamber to said kiln, a by-pass extending from said feed pipe to discharge into said kiln, means to control flow of material in said feed pipe and by-pass, a hot gas flue affording communication between said gas chamber and drier chamber, a casing containing a dust chamber, a stack in communication with said dust chamber, an exhaust fan discharging into said dust chamber, means to drive said fan, an exhaust flue extending from said drier chamber and in communication with the intake of said fan and with said dust chamber, a gas-dust flue extending from said gas chamber and in communication with the intake of said fan and with said dust chamber, and dampers to control gas flow between said exhaust flue and fan, between said gas-dust flue and fan, between said gas-dust flue and dust chamber, and between said exhaust flue and dust chamber.

9. In apparatus for production of cement clinker and the like, the combination of a casing containing a drier chamber, a conveyer in said chamber, means to drive said conveyer, a trough positioned transversely and above said conveyer and having discharge vents, means to control discharge through said vents, means to feed raw material to said trough, means to move material longitudinally in said trough, a kiln, a casing containing a gas chamber disposed to receive hot gases from said kiln, means to feed material, emanating from said conveyer, from said drier chamber to said kiln, a draft element, a hot gas flue affording communication between said gas chamber and drier chamber, and an exhaust flue affording communication between said drier chamber and said draft element.

10. In apparatus for production of cement clinker and the like, a casing containing a drier chamber, a conveyer in said chamber, means to drive said conveyer, a feed pipe extending into said chamber and discharging onto said conveyer, means to supply raw material to said pipe, a kiln, a casing containing a gas chamber disposed to receive hot gases from said kiln, means to feed material, emanating from said conveyer, from said drier chamber to said kiln, a by-pass connected with said feed pipe and disposed to discharge into said kiln, means to control flow of material in said feed pipe and by-pass, a draft element, a hot gas flue affording communication between said gas chamber and drier chamber, and an exhaust flue affording communication between said drier chamber and draft element.

11. In apparatus for production of cement clinker and the like, a casing containing a drier chamber, means to feed raw material to said chamber, a conveyer receiving fed material near one end of said chamber and moving it toward the other end, means to move material, emanating from said conveyer, in the opposite direction in said chamber, a casing containing a gas chamber, a kiln positioned to discharge hot gases into said gas chamber, means to feed material from said drier chamber to said kiln, a hot gas flue affording communication between said gas chamber and drier chamber, an exhaust flue extending from said drier chamber, and means to induce outward flow of gas in said exhaust flue.

12. In apparatus for production of cement clinker and the like, a casing containing a drier chamber, an upper conveyer in said chamber driven in one direction, therebeneath in said chamber a lower conveyer driven in the opposite direction positioned to receive material from said upper conveyer, a kiln, a casing containing a gas chamber disposed to receive hot gases from said kiln, means to feed raw material to said upper conveyer, means to feed material, emanating from said conveyers, from said drier chamber to said kiln, a hot gas flue affording communication between said gas chamber and drier chamber, an exhaust flue extending from said drier chamber, and means to induce outward flow of gas in said exhaust flue.

13. In apparatus for production of cement clinker and the like, a casing containing a drier chamber, an upper conveyer in said chamber driven in one direction, therebeneath in said chamber a lower conveyer driven in the opposite direction and positioned to receive material from said upper conveyer, means to feed raw material to said upper conveyer, another conveyer in the lower portion of said chamber arranged to move material, emanating from said upper and lower conveyers, toward an end of said chamber, a casing containing a gas chamber, a kiln positioned to discharge hot gases into said gas chamber, means to feed material from said drier chamber to said kiln, a hot gas flue affording communication between said gas chamber and drier chamber, an exhaust flue extending from said drier chamber, and means to induce outward flow of gas in said exhaust flue.

14. In apparatus for production of cement clinker and the like, a casing containing a drier chamber, a casing containing a gas chamber, a kiln arranged to discharge hot gases directly into said gas chamber, means to feed raw material to said drier chamber, means to feed material from said drier chamber to said kiln, a hot gas flue affording communication between said gas chamber and drier chamber, an exhaust casing, a gas-dust flue extending downwardly from said gas chamber and in communication with said exhaust casing, an exhaust flue extending from said drier chamber and in communication with said exhaust casing, and means to induce outward flow of gas from said exhaust casing.

15. In apparatus for production of cement clinker and the like, a casing containing a drier chamber, a casing containing a gas chamber, a kiln arranged to discharge hot gases directly into said gas chamber, means to feed raw material to said drier chamber, means to feed material from said drier chamber to said kiln, a hot gas flue affording communication between said gas chamber and drier chamber, a casing containing a dust chamber, an exhaust casing, a gas-dust flue extending from said gas chamber and in communication with said dust chamber and with said exhaust casing, an exhaust flue extending from said drier chamber and in communication with said exhaust casing, means to cause discharge of gas from said exhaust casing, and dampers to control flow of gas from said gas-dust flue into said dust chamber, from said gas-dust flue into said exhaust casing, and from said exhaust flue into said exhaust casing.

16. In apparatus for production of cement clinker and the like, a casing containing a drier chamber, an upper conveyer in said chamber normally operating to move material in one direction, therebeneath in said chamber a lower conveyer positioned to receive material from said upper conveyer and normally operating to move material in the opposite direction, there being a gas passage leading into said chamber, a kiln from which hot gases are delivered to said passage, means to feed raw material to said upper conveyer, means to feed material from said drier chamber to said kiln, an exhaust flue extending from said drier chamber, and means to cause outward flow of gas in said exhaust flue.

17. In apparatus for production of cement clinker and the like, a casing containing a drier chamber, an upper conveyer in said chamber normally operating to move material fed thereto in one direction, therebeneath in said chamber a lower conveyer positioned to receive material from said upper conveyer and normally operating to move material in the opposite direction, therebelow another conveyer normally operating to move material, emanating from said upper and lower conveyers, toward an end of said chamber, there being a gas passage leading into said chamber, a kiln from which hot gases are delivered to said passage, an exhaust flue extending from said drier chamber, and means to cause outward flow of gas in said exhaust flue.

HAAVARD KRONSTAD.

REFERENCES CITED

The following references are of record in the file of this patent:

UNITED STATES PATENTS

| Number | Name | Date |
|---|---|---|
| 1,775,313 | Lellep | Sept. 9, 1930 |
| 1,955,914 | Holzapfel | Apr. 24, 1934 |
| 2,119,615 | Wendeborn | June 7, 1938 |
| 2,346,500 | Moore | Apr. 11, 1944 |
| 2,377,123 | Ballany et al. | May 29, 1945 |